Patented Dec. 3, 1929

1,738,310

UNITED STATES PATENT OFFICE

EMIL E. NOVOTNY, OF PHILADELPHIA, AND CHARLES J. ROMIEUX, OF WEST PHILADELPHIA, PENNSYLVANIA, ASSIGNORS TO JOHN STOGDELL STOKES, OF HUNTINGDON VALLEY P. O., PENNSYLVANIA

SYNTHETIC RESIN AND PROCESS FOR MAKING SAME

No Drawing.     Application filed September 20, 1923. Serial No. 663,910.

This invention relates to synthetic resins or more particularly phenolic condensation products of phenol and benzaldehyde and to methods of preparing the same. Further, we wish to produce these condensation products free from objectionable acids, bases, and other impurities which would have a detrimental effect when such substances are used for mechanical or electrical purposes, as such extraneous materials increase moisture and electrical absorption and decrease dielectric strength. Furthermore, we produce these condensation products so that they are potentially reactive; that is, they may be hardened to their final, infusible or set form upon subsequent heat treatment. This reactivity is induced in this condensation product by the addition of certain accelerating or hardening agents. Briefly, we wish to produce a material which is especially well adapted for molding in metal dies under heat and pressure and which is preferably hardened into its final, infusible form during this operation.

In the production of our condensation product of phenol and benzaldehyde, it will be noted from the examples following that we combine the phenol and benzaldehyde in equimolecular proportions, or in other words, we do not depend upon an excess of phenol in order to secure liquid, plastic, semisolid, or resinous condensation products which are fusible and soluble. Where we produce our condensation product without the use of a catalyst, even where the benzaldehyde is combined with the phenol in its full combining ratio, permanently fusible, soluble resins may be produced which will withstand a heating up to 450° F. without becoming infusible. When accelerating or hardening agents such as acids, bases or salts are introduced, the material becomes potentially reactive, and upon subsequent heating at relatively high temperatures goes to infusibility rapidly. However, it is more desirable to use materials for this purpose which will combine with the primary condensation product such as the aldehydes or their derivatives.

The products described herein are transparent and may be produced almost colorless. We find that phenol and benzaldehyde may be condensed without the use of a catalyst to a fusible and soluble resin which, in the presence of a hardener or accelerator and upon the application of heat, may be rendered infusible and insoluble. The final products are characterized by their hardness, toughness, transparency, chemical inertness, light color, high dielectric and tensile strength. Previous to being rendered infusible they may be comminuted or mixed with suitable fillers, coloring agents, pigments, etc., or may be dissolved in a volatile solvent for use in impregnation as is already well known in the art.

Our preferred method of producing the initial fusible resin is to react phenol with benzaldehyde under a fractionating column so adjusted as to remove the water of condensation as fast as it is formed. It is thus possible to maintain the reacting mixture at a much higher temperature than would be possible were the reaction conducted under an ordinary reflux condenser and also to more thoroughly combine the phenol and benzaldehyde, as water appears to arrest the reaction. We thus find that reacting the benzaldehyde and phenol in a closed autoclave at 480° F. for several hours yields only a thin, syrupy product with a supernatant layer of water, whereas under a fractionating column high melting, hard products may be obtained.

We have also found that benzaldehyde and phenol may be condensed to form a resinous product both in the presence of acids and bases as well as of acid and basic salts or even neutral salts. Examples of such condensing agents are hydrochloric and sulphuric acids, sodium and potassium hydroxides, ammonia, alum, potassium and sodium carbonate and ammonium chloride. These catalysts may be removed from the fusible condensation product previous to reacting it to infusibility Since the condensing agents enumerated also act in a greater or less degree as hardening or accelerating agents for the final reaction, great care must be taken in condensing phenol and benzaldehyde with these substances as otherwise the material may become prematurely infusible. On account of this sensitiveness great care must be taken in controlling the temperatures, and since these materials are extremely poor conductors of heat, such control is exceedingly difficult when running large commercial batches. The fusible product obtained without a catalyst, on the other hand, is marked by its extreme stability at elevated temperatures, samples having been heated for a considerable period of time at 500° F. without apparent change.

These fusible products may be converted to the infusible, insoluble state by heating in the presence of small quantities of suitable hardening agents such as inorganic acids or acid salts, methylene containing or engendering bodies, acetaldehyde, furfural, and other aliphatic or aromatic aldehydes. The fusible condensation product may be prepared varying in consistency from a very high melting resin to a soft, plastic, semi-solid or syrup. It should be noted in this connection that we employ such ratios or carry out purification in such a manner that not more than traces of free uncombined phenol are present in the fusible product, and hence we do not rely upon an excess of phenol to produce fusibility.

We do not wish to limit ourselves to the precise ratios of materials and methods described in the following examples, but merely cite them as typical of our procedure to produce condensation products of phenol and benzaldehyde.

Example 1

A mixture of 100 parts of anhydrous phenol and 100 parts of technical benzaldehyde is placed in a suitable vessel connected to a fractionating column so constructed that no phenol and only relatively small amounts of benzaldehyde are passed into the distillate. The mixture is boiled for about two hours with the still head maintained at 200 to 215° F. and the temperature of the mixture rising gradually from 350° F. to 480° F. A hard, brittle, slightly reddish, transparent, fusible resin is thus obtained.

Example 2

A mixture of 100 parts of anhydrous phenol and 100 parts of technical benzaldehyde and 5 parts of concentrated hydrochloric acid is placed in a suitable vessel connected to a reflux condenser. The mixture is boiled for one hour, whereupon it separates into two layers, the upper containing essentially water, and the lower being heavy, oily and viscous. The water layer is poured off, and steam is blown through the lower layer until all uncombined phenol and benzaldehyde, as well as the hydrochloric acid, have been removed. A reddish, plastic material just sufficiently solid to show a fracture when struck a blow at room temperatures is thus obtained. This

Example 3

A mixture of 100 parts anhydrous phenol, 100 parts of technical benzaldehyde, and 5 parts of dry potassium carbonate is placed in a suitable vessel connected to a reflux condenser. The mixture is boiled for several hours, the condenser is reversed and excess reactants distilled off. A hard, glassy, transparent, soluble and fusible resin is thereby obtained. This product may be subsequently hardened in the presence of a suitable accelerating and hardening agent and upon the application of heat.

Example 4

The fusible resins prepared as described in Examples 1 to 3 inclusive may be rendered thermo-reactive by the following treatment: Dissolve 100 parts of the condensation product in 35 to 45 parts of alcohol and mix therewith 5 to 22 parts of a 45 per cent water solution of hexamethylenetetramin. The clear solution thus obtained is preferably boiled under a reflux condenser for two to three hours, whereby most of the hexamethylenetetramin is combined with the resin as is evidenced by the evolution of ammonia. The resulting solution may be used for impregnating laminated sheets of paper or cloth, or may be used for the impregnation of fillers such as wood flour or asbestos. After evaporating the solvents these products may be formed into desired shapes and rendered infusible by the application of heat or heat and pressure. If preferred, the hexamethylenetetramin may be added dry to the powdered fusible resin and mixed therewith, or the mixing may be conducted on hot rolls. We may also add the hexamethylenetetramin solution to a low melting resin or semi-solid heated sufficiently to render it fluid but not exceeding 200° F. Or again, if preferred, the hexamethylenetetramin may be added dry thereto. In the above example commercial formaldehyde may be substituted for the hexamethylenetetramin solution in suitable proportions.

The aldehydes such as formaldehyde, acetaldehyde and furfural are very satisfactory solvents for these fusible resins, and as the heat treatment previously mentioned causes these to combine to any desired degree it is evident that potentially reactive products may be formed by the utilization of this step. Furthermore, the solvent properties of furfural together with its low volatility as counter distinguished in the latter case with formaldehyde or acetaldehyde make it admirably suitable for use as a solvent or softening medium for cold molding, thus permitting the shaping of the molded piece either cold or with a relatively low degree of heat, heat as in an oven. This heating is preferably over a period of hours either at low temperature or at gradually increasing temperature.

Where we have herein used the term phenol we wish this to include bodies having phenolic properties, and where we have herein used the term hexamethylenetetramin we wish this to include active methylene compounds. Instead of dissolving fusible condensation products in alcohol, other solvents, if preferred, may be employed, for example acetone, amyl-alcohol, ether, furfural, and the like.

What we claim is—

1. The herein described method which comprises subjecting a resin-forming mixture including a phenol to a boiling action until water separates from the mass, separating resin forming ingredients from said water, returning the resin forming ingredients to the zone of reaction and rejecting the synthetic water as formed.

2. The herein described method which consists in subjecting a mixture of phenol and benzaldehyde in substantially equal molecular portions in association with a fractionating column to a boiling action, while continuously eliminating the water of reaction from the mass, and at the same time returning the resin forming ingredients to the boiling zone, and again subjecting them to the boiling action.

3. The herein described method of making synthetic resins which comprises subjecting a mixture of resin-forming ingredients to a boiling action whereby a reactive resinous substance and synthetic water are produced, continuously removing the synthetic water as it is formed, while returning the resin forming ingredients to the mass.

4. The herein described method of making synthetic resins which comprises subjecting a mixture of resin-forming ingredients to a boiling action in association with a fractionating column whereby a reactive resinous substance and synthetic water are produced, continuously removing the synthetic water as it is formed, while returning the resin forming ingredients to the mass.

5. The herein described method of producing a condensation product which comprises subjecting a mixture of substantially equimolecular proportions of phenol and benzaldehyde to the action of heat to form a condensation product and eliminating the water from the reaction mass as it is formed.

6. The herein described method which comprises subjecting a mixture of anhydrous phenol, benzaldehyde and hydrochloric acid to a boiling action until water separates out from the mass, then removing said water and then passing steam through the mass to eliminate any uncombined phenol and benzaldehyde, as well as hydrochloric acid, thereby producing a plastic, fusible, soluble mass.

7. The herein described method which comprises subjecting a mixture of anhydrous phenol, benzaldehyde and hydrochloric acid to a boiling action until water separates out from the mass, then removing said water and then passing steam through the mass to eliminate any uncombined phenol and benzaldehyde, as well as hydrochloric acid, thereby producing a plastic, fusible, soluble mass and subsequently hardening said mass in the presence of a suitable accelerating and hardening agent and upon the application of heat.

8. The herein described method which comprises preparing a fusible resin by subjecting a mixture of phenol and benzaldehyde to the action of heat to produce a fusible soluble body, dissolving said fusible soluble body in a solvent and adding thereto hexamethylene tetramin, and then subjecting the mixture to the action of heat until substantially all of the hexamethylene tetramin is combined with the mass.

9. The herein described method which comprises subjecting a resin forming mixture including a phenol and an aldehyde to a boiling action until water separates from the mass, separating resin forming ingredients from said water, returning the resin forming ingredients to the zone of reaction, and rejecting synthetic water as formed.

10. The herein described method which comprises subjecting a resin forming mixture including a phenol to a boiling temperature and separating the water of reaction substantially as fast as it is formed by means of a fractionating column so regulated as to allow the water to escape and to return the resin forming material to the reaction zone.

11. A plastic moldable material comprising a condensation product of benzaldehyde and phenol obtained by heating the said ingredients to a boiling temperature and removing the water of condensation substantially as fast as it is formed.

Signed at Philadelphia in the county of Philadelphia and State of Pennsylvania this 19th day of September, A. D. 1923.

EMIL E. NOVOTNY.
CHARLES J. ROMIEUX.